United States Patent [19]
Kurdziel

[11] Patent Number: 5,261,683
[45] Date of Patent: Nov. 16, 1993

[54] BICYCLE TRAILER WITH DETACHABLE CHILD SEAT

[76] Inventor: Mark S. Kurdziel, 6830 W. 115th Pl., Worth, Ill. 60482

[21] Appl. No.: 5,633

[22] Filed: Jan. 19, 1993

[51] Int. Cl.⁵ .............................................. B62K 27/02
[52] U.S. Cl. .................................................. 280/204
[58] Field of Search ........................ 280/204, 202, 292

[56] References Cited
U.S. PATENT DOCUMENTS 5,020,814  6/1991  George et al. ...................... 280/204
5,076,599 12/1991  Lockett et al. ..................... 280/204

Primary Examiner—Mitchell J. Hill
Attorney, Agent, or Firm—Douglas B. White

[57] ABSTRACT

There is provided a bicycle trailer having a frame mounted on a wheel and axle assembly and having a hitch for attachment to the bicycle. The frame is arranged to cradle a seat of the type used in automobiles for transporting children. A mechanism for attaching the seat is mounted to the frame for releaseably securing bottom rail members of the seat to the frame. This mechanism includes a pin member for engagement of one of the bottom rails and a spring loaded pivotally mounted hook member for engagement of the other rail.

5 Claims, 2 Drawing Sheets

BICYCLE TRAILER WITH DETACHABLE CHILD SEAT

BACKGROUND OF THE INVENTION

1. Field of the Invention

The present invention relates to trailers for bicycles used to transport young children. More particularly this invention relates to an improvement in such trailers to accommodate the child seats used in automobiles.

2. Description of the Prior Art

Bicycle trailers currently on the market present an expensive unified structure of a frame and seat combination. While elaborate child seats are employed for the transport of children in cars, no apparatus has been presented which can adapt these car seats for use with a bicycle trailer. Such adaptation saves considerable expense in the manufacture of the trailer, avoids duplication of seats, and also presents a safer, more comfortable trailer.

SUMMARY OF THE INVENTION

There is provided a bicycle trailer having a frame mounted on a wheel and axle assembly and having a hitch for attachment to the bicycle. The frame is arranged to cradle a seat of the type used in automobiles for transporting children. A mechanism for attaching the seat is mounted to the frame for releaseably securing bottom rail members of the seat to the frame. This mechanism includes a pin member for engagement of one of the bottom rails and a spring loaded pivotally mounted hook member for engagement of the other rail.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
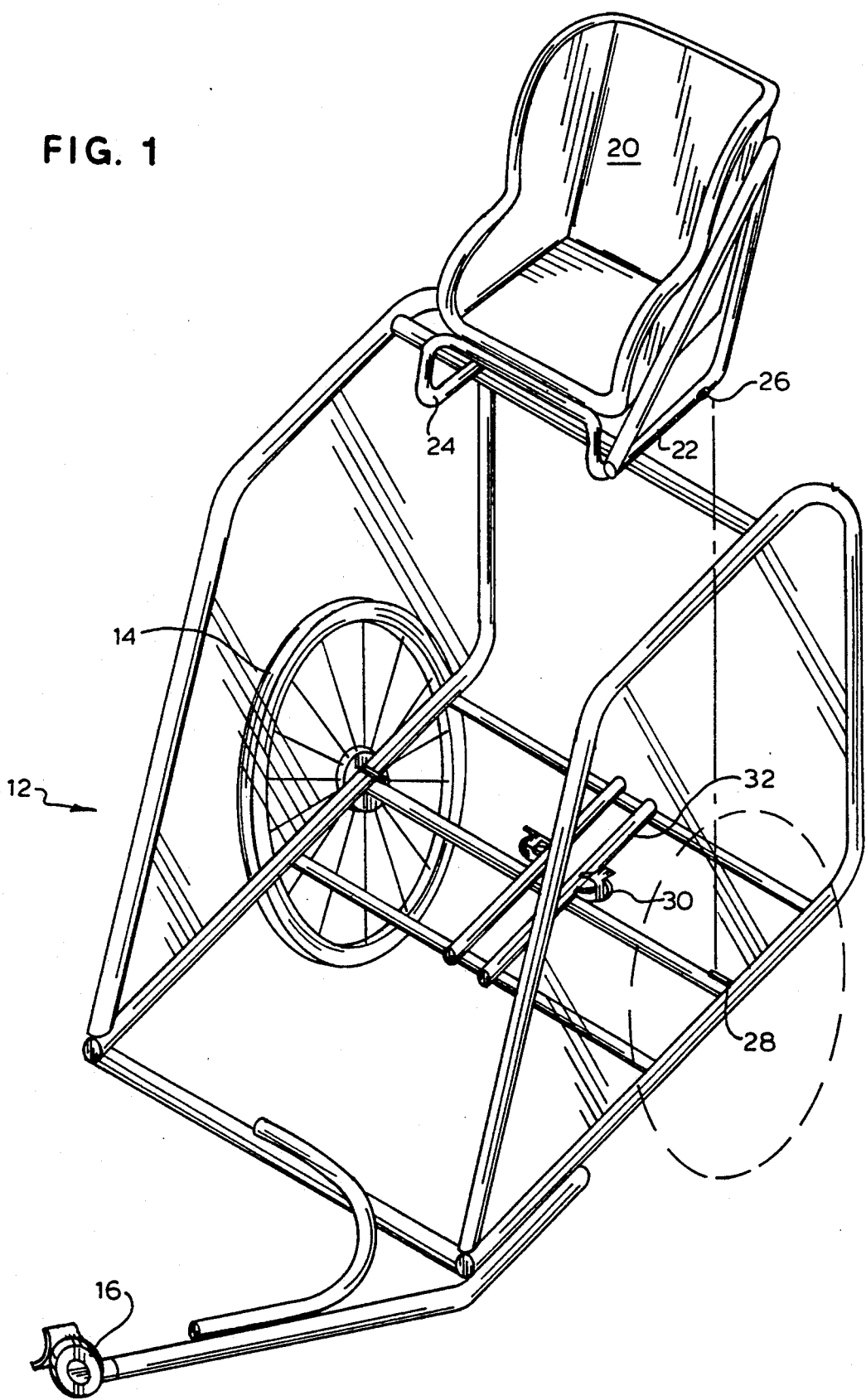
FIG. 1 is an exploded perspective view of the trailer of the present invention showing the seat removed.

Turning first to FIG. 1 there is shown a trailer for attachment to a bicycle or the like, including a frame base 12 supported on wheels 14 and a hitch 16 for pivotal attachment to the bicycle.

Figure 3:
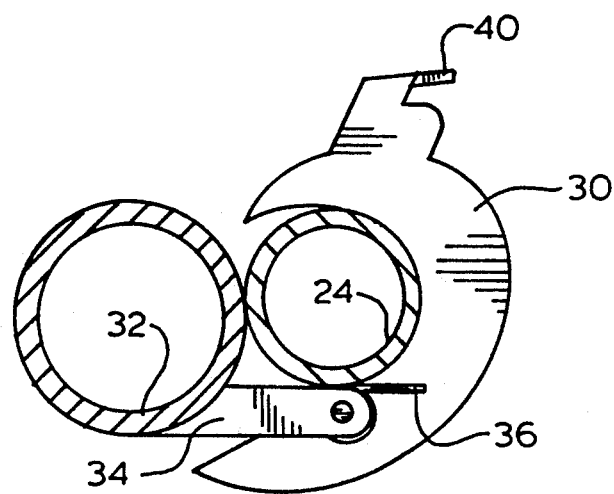
FIG. 3 is a cross sectional view of the latch feature of the trailer of the present invention.
Figure 2:
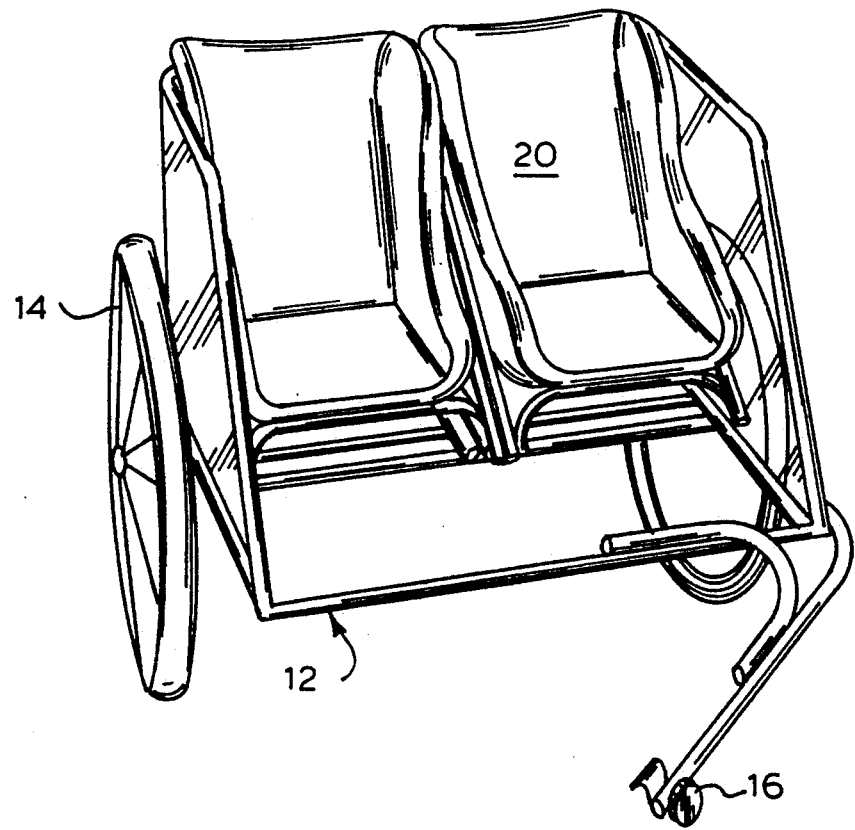
FIG. 2 is a perspective view of the trailer of the present invention showing the seat installed.

In accordance with the improvement of the present invention, a child's seat 20 (of the type used to transport children in automobiles) is detachable from the trailer for use in automobiles. This seat exhibits supporting bottom rails 22 and 24 and is attached to the trailer thereby. A hole 26 in the rail 22 is positioned to accept a pin 28 mounted to the frame 12. The other rail is secured by a latch comprising a spring loaded hook 30 as more clearly shown in FIG. 3. A longitudinal reinforcing member 32 on the frame has secured thereto a projecting support 34. The hook 30 is mounted for pivotal motion to the projecting support and biased toward closure by a coil spring 36. An upper tab 40 on the latch is presented to facilitate manual opening of the latch to allow entry and exit of the rail 24. Accordingly, an automobile child's seat having bottom supporting rails may be easily adapted to this trailer by simply the addition of the hole 26.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A bicycle trailer comprising:
   a frame mounted on a wheel and axle assembly and having a hitch for attachment to the bicycle, said frame being arranged to cradle a seat placed therein;
   a detachable seat for transporting children, said detachable seat having first and second bottom rail members for support thereof; and
   seat attachment means mounted to said frame for releaseably securing said bottom rail members of said seat to said frame.

2. The bicycle trailer of claim 1 wherein said seat attachment means comprises a pin member projecting from said frame and arranged to engage said first rail member, and further comprises latch means for engaging said second rail member.

3. The bicycle trailer of claim 2 wherein said latch means comprises a hook member pivotally mounted to said frame.

4. The bicycle trailer of claim 3 further comprising spring means to urge said hook member toward a closed position.

5. The bicycle trailer of claim 4 wherein said spring means comprises a coil spring positioned at the pivotal mount of said hook member.

* * * * *